US009569265B2

(12) United States Patent
Chandel (10) Patent No.: US 9,569,265 B2
(45) Date of Patent: Feb. 14, 2017

(54) OPTIMIZATION OF DATA LOCKS FOR IMPROVED WRITE LOCK PERFORMANCE AND CPU CACHE USAGE IN MULTI CORE ARCHITECTURES

(71) Applicant: Check Point Software Technologies Ltd., Tel-Aviv (IL)

(72) Inventor: Ajay Chandel, Fremont, CA (US)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 66 days.

(21) Appl. No.: 14/507,930

(22) Filed: Oct. 7, 2014

(65) Prior Publication Data
US 2016/0098361 A1    Apr. 7, 2016

(51) Int. Cl.
*G06F 12/00* (2006.01)
*G06F 9/50* (2006.01)

(52) U.S. Cl.
CPC ......... *G06F 9/50* (2013.01); *G06F 2212/1008* (2013.01); *G06F 2212/1032* (2013.01); *G06F 2212/62* (2013.01)

(58) Field of Classification Search
None
See application file for complete search history.

(56) References Cited

U.S. PATENT DOCUMENTS

| 2008/0320262 A1* | 12/2008 | McKenney | G06F 9/52 |
| | | | 711/163 |
| 2009/0044194 A1* | 2/2009 | Rathi | G06F 9/526 |
| | | | 718/104 |
| 2013/0290967 A1* | 10/2013 | Calciu | G06F 9/526 |
| | | | 718/102 |

* cited by examiner

*Primary Examiner* — Daniel Tsui
(74) *Attorney, Agent, or Firm* — Mark M. Friedman (57) ABSTRACT

Data access optimization features the innovative use of a writer-present flag when acquiring read-locks and write-locks. Setting a writer-present flag indicates that a writer desires to modify a particular data. This serves as an indicator to readers and writers waiting to acquire read-locks or write-locks not to acquire a lock, but rather to continue waiting (i.e., spinning) until the write-present flag is cleared. As opposed to conventional techniques in which readers and writers are not locked out until the writer acquires the write-lock, the writer-present flag locks out other readers and writers once a writer begins waiting for a write-lock (that is, sets a writer-present flag). This feature allows a write-lock method to acquire a write-lock without having to contend with waiting readers and writers trying to obtain read-locks and write-locks, such as when using conventional spinlock implementations.

15 Claims, 3 Drawing Sheets

OPTIMIZATION OF DATA LOCKS FOR IMPROVED WRITE LOCK PERFORMANCE AND CPU CACHE USAGE IN MULTI CORE ARCHITECTURES

FIELD OF THE INVENTION

The present invention relates to the field of computer operating processes, and specifically concerns an operating system's kernel.

BACKGROUND OF THE INVENTION

A fundamental issue surrounding locking of data is the need to provide synchronization in certain code paths in a kernel. These code paths, called critical sections, require a combination of concurrency, or re-entrance protection, and proper ordering with respect to other events occurring in the kernel. A typical result without proper locking is called a race condition. Even a simple operation such as the C++ command of "i++" (incrementing the variable "i") is dangerous if the variable is shared! Consider a common case of a multi-processor system where one processor reads i, then another processor reads i, then both processors increment i, then both processors write i back to memory. If i were originally 2, i should now be 4, but in this case, i is in fact 3.

Operating systems, such as a Linux kernel, provide two kinds of locks, read-locks and write-locks, used by readers and writers, respectively. Typically, multiple threads can safely read data concurrently, as long as nothing modifies the data during reading. Therefore, there can be multiple concurrent readers (each with its own read-lock), but only a single writer (with a write-lock) with no concurrent readers.

Traditionally, read-write-locks are implemented in Linux using spinlocks. Read-write locks scale well in terms of performance in a "mostly-readers" case, wherein data structures in critical sections are infrequently modified. On the other hand, when a writer wants to modify data structures in a critical section, a write-lock is taken, wherein all readers and subsequent writers are blocked until the write-lock is relinquished. When there are a moderate to high number of writers, known as a "mostly-writers" case, the read-write-lock's implementation fails miserably due to writer starvation, wherein writers waiting for a write-lock have to wait until all the readers relinquish the lock. Read-write locks scales well only for "mostly-readers" case at the cost of poor performance in case, writers are present.

Additionally, read-write-lock implemented in a standard Linux kernel is not optimized for cache access and causes many cache invalidations while spinning, especially when writers are also present. This high incidence of cache invalidations is mainly attributed to the fact that even blocked spinning readers and writers still keep on modifying the cache to check whether the lock has been released or not. As is known in the field, the process of checking if the lock is release or not includes doing some write operation on lock and check if the lock is available, this causes the cache invalidation of the memory associated with lock for all CPUs accessing the memory. This implementation has become a hugely degrading factor in the newest Intel processors, such as a Sandy Bridge processor, which has the latest cache-sync protocols and other hardware optimizations for cache behavior. These cache invalidations start to degrade performance even more when we use per-CPU locks in multi-core architectures like the Sandy Bridge (with 2 sockets of 8 cores each), because a dramatic increase in the number of spinning locks results in more frequent cache modifications. Furthermore, the increase makes read-write-locks even harder to acquire.

There is therefore a need for an optimization of spinlock-based read-write locks that scales well in terms of performance in both mostly-readers and mostly-writers cases, and also optimizes utilization of the CPU cache to reduce cache invalidations, as compared to conventional techniques.

SUMMARY

According to the teachings of the present embodiment there is provided a method for data access by a CPU, the method including the steps of: checking if a writer-present flag is set or cleared; and acquiring a read-lock when the writer-present flag is cleared.

In another optional embodiment, the step of checking includes performing a first writer-present flag status check, and if the first writer-present flag status check determines that the writer-present flag is: set, repeating the step of checking; or cleared, initially acquiring the read-lock, subsequent to the initially acquiring the read-lock, performing a second writer-present flag status check, and if the second writer-present flag status check determines that the writer-present flag is: set, releasing the read-lock and repeating the first writer-present flag status check; or cleared, maintaining the read-lock.

In another optional embodiment, repeating the step of checking includes implementing a spinlock.

In another optional embodiment, the read-lock is: associated with a CPU group that includes a plurality of CPUs; and for data accessed via the CPU group.

Another optional embodiment includes a step of: releasing the read-lock.

In another optional embodiment, releasing the read-lock includes clearing the read-lock flag.

According to the teachings of the present embodiment there is provided a method for data access by a CPU, the method including the steps of: checking if a writer-present flag is set or cleared; and acquiring a write-lock when the writer-present flag is cleared.

In another optional embodiment, the step of checking includes performing a first writer-present flag status check, and if the first writer-present flag status check determines that the writer-present flag is: set, repeating the step of checking; or cleared, setting the writer-present flag, and subsequent to setting the writer-present flag, performing a second writer-present flag status check, and if the second writer-present flag status check determines that the setting the writer-present flag is: unsuccessful, repeating the first writer-present flag status check; or successful, performing a read-lock check, if the read-lock check determines that the read-lock is: set, repeating the performing a read-lock check; or cleared, acquiring the write-lock.

In another optional embodiment, the repeating the step of checking includes implementing a spinlock. In another optional embodiment, the repeating the step of performing a second writer-present flag status check includes implementing a spinlock.

In another optional embodiment, the write-lock is: associated with a CPU group that includes a plurality of CPUs; and for data accessed via the CPU group.

Another optional embodiment, includes the step of: releasing the write-lock.

In another optional embodiment, releasing the write-lock includes clearing the write-lock flag.

According to the teachings of the present embodiment there is provided a system including: a processing system containing one or more processors, the processing system being configured to: check if a writer-present flag is set or cleared; and acquire a read-lock when the writer-present flag is cleared.

In another optional embodiment, the processing system is further configured to perform the checking via a first writer-present flag status check, and if the first writer-present flag status check determines that the writer-present flag is: set, repeating the checking; or cleared, initially acquiring the read-lock, subsequent to the initially acquiring the read-lock, performing a second writer-present flag status check, and if the second writer-present flag status check determines that the writer-present flag is: set, releasing the read-lock and repeating the first writer-present flag status check; or cleared, maintaining the read-lock.

According to the teachings of the present embodiment there is provided a system including: a processing system containing one or more processors, the processing system being configured to: check if a writer-present flag is set or cleared; and acquire a write-lock when the writer-present flag is cleared.

In another optional embodiment, the processing system is further configured to perform the checking via a first writer-present flag status check, and if the first writer-present flag status check determines that the writer-present flag is: set, repeating the step of checking; or cleared, setting the writer-present flag, and subsequent to setting the writer-present flag, performing a second writer-present flag status check, and if the second writer-present flag status check determines that the setting the writer-present flag is: unsuccessful, repeating the first writer-present flag status check; or successful, performing a read-lock check, if the read-lock check determines that the read-lock is: set, repeating the performing a read-lock check; or cleared, acquiring the write-lock.

According to the teachings of the present embodiment there is provided a computer-readable storage medium having embedded thereon computer-readable code for data access by a CPU, the computer-readable code including program code for: checking if a writer-present flag is set or cleared; and acquiring a read-lock when the writer-present flag is cleared.

According to the teachings of the present embodiment there is provided a computer-readable storage medium having embedded thereon computer-readable code for data access by a CPU, the computer-readable code including program code for: checking if a writer-present flag is set or cleared; and acquiring a write-lock when the writer-present flag is cleared.

In another optional embodiment, the program code further performs the checking via a first writer-present flag status check, and if the first writer-present flag status check determines that the writer-present flag is: set, repeating the step of checking; or cleared, setting the writer-present flag, and subsequent to setting the writer-present flag, performing a second writer-present flag status check, and if the second writer-present flag status check determines that the setting the writer-present flag is: unsuccessful, repeating the first writer-present flag status check; or successful, performing a read-lock check, if the read-lock check determines that the read-lock is: set, repeating the performing a read-lock check; or cleared, acquiring the write-lock.

According to the teachings of the present embodiment there is provided a computer program that can be loaded onto a server connected through a network to a client computer, so that the server running the computer program constitutes a server in a system according to any one of the teachings of the current invention.

According to the teachings of the present embodiment there is provided a computer program that can be loaded onto a computer connected through a network to a server, so that the computer running the computer program constitutes a client computer in a system according to any one of the teachings of the current invention.

BRIEF DESCRIPTION OF FIGURES

The embodiment is herein described, by way of example only, with reference to the accompanying drawings, wherein.

DEFINITIONS

For convenience of reference, this section contains a brief list of abbreviations and short definitions used in this document. This section should not be considered limiting. Fuller descriptions can be found below, and in the applicable Standards.

Cleared—A status of a flag variable, whereby the variable's value is FALSE. Opposite of "set."

CPU Group—At least one CPU, typically a plurality of CPUs constituting a multi-processor implementation. In the context of this application, the terms "all CPUs," "any CPU," and "each CPU" generally refer to CPUs that constitute a single CPU group executing a single kernel instance that contains a feature under discussion.

Lock—A synchronization mechanism for enforcing limits on access to a resource where there are many threads of execution, as in the environment of a multi-processor and the multi-processor's cache. A lock is designed to enforce a mutual exclusion concurrency control policy. Types of locks include read-locks and write-locks.

Flag—Typically one or more bits representing a binary value that has an assigned meaning.

Mostly-Readers case—A case where a majority of processes attempting to access a particular data are processes for reading the particular data.

Mostly-Writers case—A case where a majority of processes attempting to access a particular data are processes for modifying the particular data.

Read-lock—A type of lock acquired by readers that blocks writers from acquiring a write-lock and writing until readers at all CPUs hosting the kernel finish reading and release the read-locks.

RLM—Abbreviation for Read-Lock Method

Set—A status of a flag variable, whereby the variable's value is TRUE. Opposite of "cleared."

Spin—A loop procedure wherein a condition needed to proceed toward acquiring a lock is repeatedly checked for until the condition has been met. No other process besides the repeated checking is referred to by use of the terms "spin" or "spinning".

Spinlock—A lock implemented by means of a spin.

WLM—Abbreviation for Write-Lock Method

Write-lock—A type of lock acquired by a writer that blocks readers from acquiring a read-lock and reading and other new writers from acquiring a write-lock and writing until the current writer with the write-lock finishes writing and releases the write-lock.

Detailed Description—FIGS. 1A-3

The principles and operation of a present embodiment may be better understood with reference to the figures and the accompanying description.

A present invention relates to an optimization in how locks are acquired, with significant improvements in performance over conventional techniques. The present embodiment includes the following features:

1. A read-lock method, used by one or more readers for each of the readers to acquire a read-lock. Acquisition of one or more read-locks blocks writers from acquiring a write-lock until the readers are finished reading and all read-locks are released (i.e., the read-lock method implementation used by each of the readers releases the read-lock; and
2. A write-lock method, used by a writer to acquire a write-lock. Acquisition of the write-lock blocks new readers from acquiring any read-locks and new writers from acquiring the write-lock until the current writer is finished writing and the write-lock method releases the write-lock used by the current writer.

The read-lock and write-lock methods of the optimization are typically implemented in a kernel hosted by a CPU group. In the context of this description, a CPU group is defined as at least one CPU, typically a plurality of CPUs constituting a multi-processor implementation. The optimization system and method described herein are particularly useful for augmenting performance of spinlock implementations of locks when used in a CPU group with a multi-core architecture, such as an Intel Sandy Bridge processor.

The optimization is enabled by an innovative use of a writer-present flag. When set (i.e., when the value of the writer-present flag is true), the writer-present flag indicates a writer is present. A writer is present when there is a process (writer) desiring to modify particular data, waiting to modify the particular data, or in the process of modifying the particular data. A writer must wait for other writers and readers to finish accessing the particular data before modifying the data, in order to maintain the integrity of the overall processing and data. When the write-lock method wants to take a write-lock, the write-lock method sets the writer-present flag. When set, the writer-present flag serves as an indicator to waiting readers and writers waiting to acquire a read-lock or a write-lock not to acquire a read-lock or a write-lock, but rather to continue waiting (i.e., spinning). After setting the writer-present flag, the write-lock method waits until remaining readers (that is, all readers in a kernel instance hosted by a CPU group) finish reading and release remaining read-locks. The write-lock method then acquires the write-lock and allows the writer to proceed with writing.

Because the writer-present flag locks out other readers and writers once a writer begins waiting for a write-lock (that is, sets a writer-present flag)—as opposed to prior techniques in which readers and writers are not locked out until the writer acquires the write-lock—the optimization allows the write-lock method to acquire a write-lock without having to contend with waiting readers and writers trying to obtain read-locks and write-locks, as is the case when using conventional read-lock and write-lock methods, (e.g., when using spinlock implementations). Writers are thus spared from unnecessary waiting, as during repeated assignment of just-released read-locks or write-locks to a single random one of many possible spinning (i.e., waiting) readers and other writers, thus avoiding the above-described conventional writer starvation. The write-lock method only has to wait for existing readers to finish reading and all read-locks to be released. Therefore, the write-lock method acquires the write-lock in one shot, resulting in a significant improvement in performance of writing operations over the conventional spinlock technique in a "mostly writers" case, especially where the number of writers are sufficiently high that the write-lock needs to be held for a large majority of the time (can be around 80 to 90% of the time). However, improvement is also evident where the write-lock needs to be held only a moderate majority of the time (can be around 50% of the time).

A feature of the current embodiment is the use of a writer-present flag in addition to a write-lock flag. Whereas a conventional write-lock flag indicates that a process currently has a lock, a writer-present flag indicates that a process is waiting to acquire a lock.

The current embodiment possesses another feature as well. Conventional read-lock and write-lock methods, while spinning and waiting to acquire a read-lock or write-lock, modify CPU cache when checking whether a read-lock or write-lock has been released. Such modifying causes cache invalidations that occur repeatedly during spinning, resulting in a significant degradation in performance of the CPU. In contrast, a feature of the current embodiment of the optimization is performing only read operations to check the writer-present flag. In other words, write operations are not performed to check the writer-present flag. This feature eliminates repeated cache invalidations while a reader or writer is spinning. Cache invalidations may only occur once for each reader and once for each writer. A cache invalidation may occur once for each reader, when the read-lock method acquires a read-lock. Since writers are not present, the cache remains warm. With per-CPU read-locks, each thread gets a corresponding read-lock (based on the CPU on which the thread is running) and the thread takes the corresponding lock for reading. As this lock is only accessed/modified from single CPU context, there are no communication overheads of synchronizing this memory/cache to other CPUs and readers will execute with minimal lock latency.

If the read-locks are not per-CPU, then any modifications to this read-lock (i.e. trying read/write), needs to be synched to all the CPUs cache. As soon as memory is modified, the cache line for this memory present in all the CPUs is invalidated and synchronized from the CPU who touched this memory. This leads to large non-deterministic communication overheads and is very inefficient.

In the context of this document, the term "warm cache" generally refers to a condition where data is present in the CPU cache lines and the thread does not need to access memory to read data. Accessing CPU cache is very efficient and has lowest latencies as compared to fetching data from memory A cache invalidation may occur only once for each writer: when the write-lock method sets the writer-present flag, a vast improvement over the repeated cache invalidations for each writer that occur using a conventional technique. With much fewer cache invalidations as compared to conventional implementations, performance of CPU cache utilization is thus significantly improved as compared to conventional spinlock techniques.

Figure 1A:
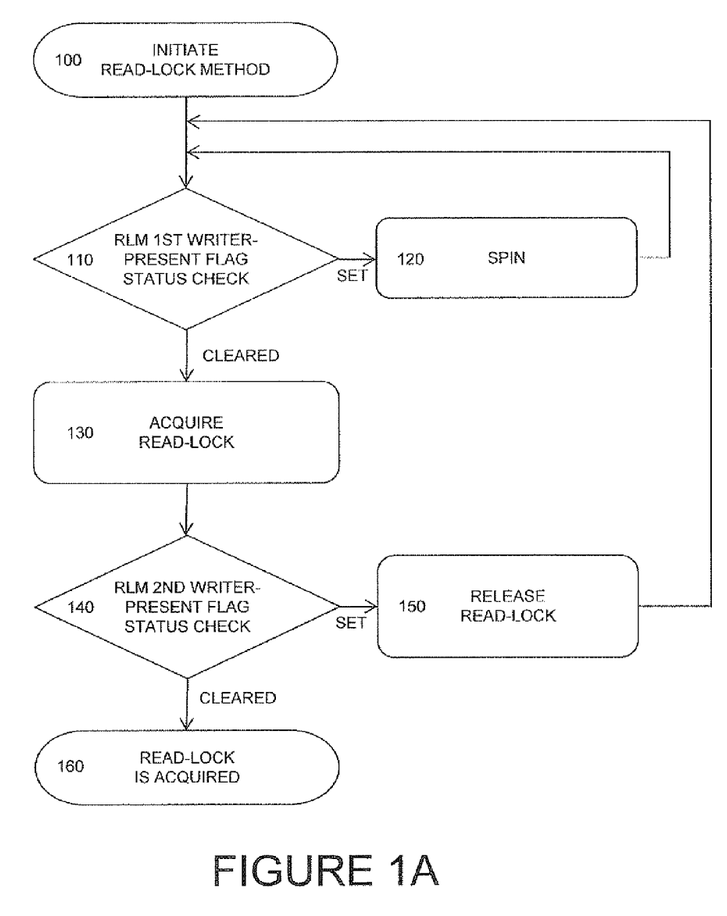
FIG. 1A is a flowchart of a read-lock method.
Figure 1B:
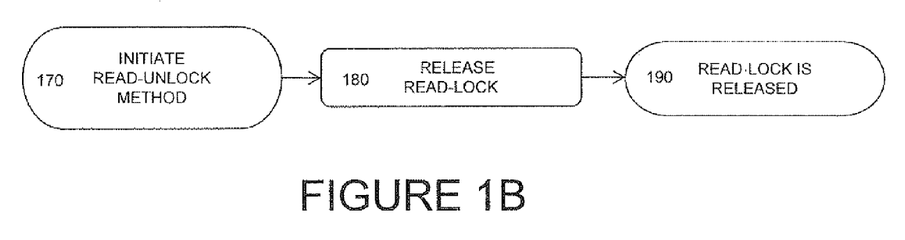
FIG. 1B is a flowchart of a read-unlock method.

Operation—Read-Lock and Read-Unlock Methods—FIGS. 1A-1B

Refer now to FIG. 1A, a flowchart of a read-lock method according to the current embodiment. For a reader to acquire a read-lock, the read-lock method is initiated 100. The read-lock method (RLM) then performs an RLM first writer-present flag status check 110, checking whether a writer-present flag is set or cleared (i.e., whether the writer-present flag's Boolean value is TRUE or FALSE, respectively). If the writer-present flag is set, the read-lock method enters a spin 120, whereby the RLM first writer-present flag status check 110 is repeated until the writer-present flag is cleared. Once the RLM first writer-present flag status check 110 finds the writer-present flag is cleared, the read-lock method sets a read-lock flag, thereby initially acquiring a read-lock 130. The read-lock can be the same type of read-lock used in conventional implementations. The read-lock method then performs an RLM second writer-present flag status check 140, checking whether the writer-present flag is set or cleared. The RLM second writer-present flag status check is made because there is a window of opportunity for another thread, such as a write-lock method, to set the writer-present flag in the time elapsed since the RLM first writer-present flag status check 110 (i.e., to set the writer-present flag while the read-lock method is acquiring the read-lock 130). If the writer-present flag is set, the read-lock method clears the read-lock flag, thereby clearing (releasing) the read-lock 150 and returns to the RLM first writer-present flag status check 110. If at the RLM second writer-present flag status check 140 the writer-present flag was not set (i.e., was cleared), the read-lock flag stays set, and the read-lock is acquired 160; the reader now has permission to proceed (i.e., to read).

The use of flags is well known in the field and one skilled in the art will be able to implement a writer-present flag as appropriate for a specific application. Generally, a flag is one or more bits representing a binary value that has an assigned meaning. Flags can be stored in dedicated, known locations, for example in a dedicated status register, in a general-purpose register, or in a known location in memory. Flags can also be passed to threads as needed.

Refer now to FIG. 1B, a flowchart of a read-unlock method. When the reader is finished reading, the read-unlock method is initiated 170. The read-unlock method clears the read-lock flag, thereby releasing the read-lock 180, and the read-lock is released 190.

Pseudo-Code—Read-Lock and Read-Unlock Methods

Pseudo-Code for a Read-Lock Method

The following exemplary pseudo-code algorithm is a non-limiting example of an implementation of a read-lock method:

```
While (True) {
    If WRITER_PRESENT flag is set {
        Spin        // Spin and check the flags until cleared.
    } Else {
        Acquire Read_lock
        // There might be a race when we acquire a read-lock,
        //as there can be a window of opportunity for a writer to take the
        write-lock since the
        //     Else statement
        //
        If WRITER_PRESENT flag is set {
            Release Read-lock
            Continue   // that is start over again.
        } Else {
            Break      // Reader has taken the lock.
        }
    }
}
```

Pseudo-Code for a Read-Unlock Method
Release Read_lock

Figure 2A:
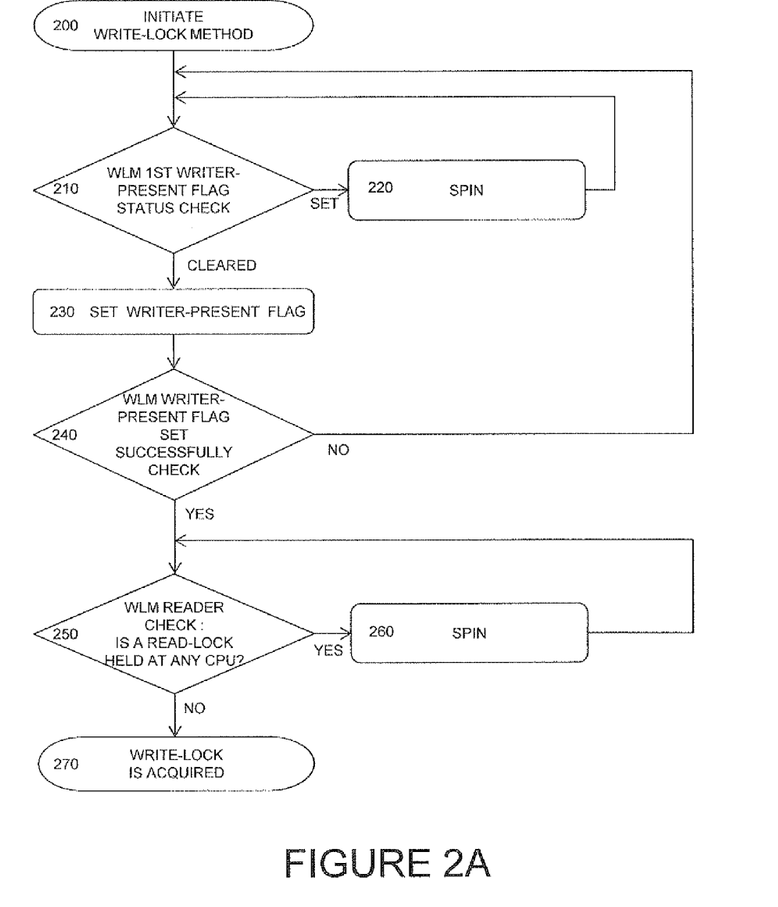
FIG. 2A is a flowchart of a write-lock method.
Figure 2B:
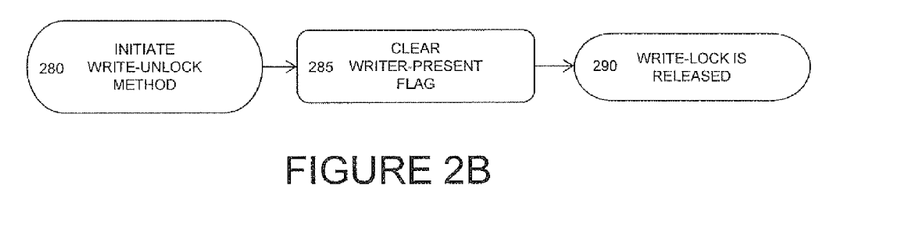
FIG. 2B is a flowchart of a write-unlock method.

Operation—Write-Lock and Write-Unlock Methods—FIGS. 2A-2B

Refer now to FIG. 2A, a flowchart of a write-lock method according to the current embodiment. For a writer to acquire a write-lock, the write-lock method is initiated 200. The write-lock method (WLM) then performs a WLM first writer-present flag status check 210, checking whether a writer-present flag is set or cleared (i.e., whether the writer-present flag's Boolean value is TRUE or FALSE, respectively). If the writer-present flag is set, then another writer has a write-lock on the data and the current write-lock method enters a spin 220, whereby the WLM first writer-present flag status check 210 is repeated until the writer-present flag is not set (i.e., until the writer-present flag is cleared by the other writer). Once the WLM first writer-present flag status check 210 finds the writer-present flag is cleared, the write-lock method sets the writer-present flag 230 for the current writer. The write-lock method then performs a WLM writer-present flag set successfully check 240, checking whether the writer-present flag was set successfully by the current writer. The WLM writer-present flag set successfully check 240 is made because there is a window of opportunity for another thread, such as another writer's write-lock method, to set a writer-present flag in the time elapsed since the WLM first writer-present flag status check 210.

The steps of set writer-present flag 230 and WLM writer-present flag set successfully check 240 may both be implemented together using a single atomic instruction: a compare-exchange (CMP-XCHG) command, which is also called a compare-and-swap (CAS) command. The CMP-XCHG command is used to compare the content of the writer-present flag to the value "cleared" (i.e., not set), and if the writer-present flag is cleared, then sets the writer-present flag; the return value of the CMP-XCHG command reflects the occurrence of successfully setting the writer-present flag. If the CMP-XCHG command finds the writer-present flag is set, then the return value of CMP-XCHG reflects that setting the writer present flag was unsuccessful (the writer-present flag is left unchanged).

If setting the writer-present flag 230 was unsuccessful (i.e., if the writer-present flag was not set successfully), the write-lock method returns to the WLM writer-present flag status check 210. If at the WLM writer-present flag set successfully check 240 the writer-present flag was set successfully, the write-lock method performs a WLM reader check 250, whereby the write-lock method checks whether a read-lock is held (i.e., whether a reader is still reading) at any CPU in the CPU group (i.e., at any CPU in the set of CPUs hosting the kernel instance presently executing the write-lock method). If a read-lock is held at any CPU, the write-lock method enters a spin 260, whereby the WLM reader check 250 is repeated until no read-lock is held at any CPU in the CPU group (i.e., until readers finished reading and released the read-locks). Once the WLM reader check 250 finds that no read lock is held at any CPU in the CPU group (i.e., that readers finished reading and released the read-locks), the write-lock is acquired 270. The writer now has permission to proceed (i.e., to write).

Note that a write-lock has been acquired by virtue of two conditions: first, the WLM writer-present flag set successfully check 240 found the writer-present flag was set successfully; and second, the WLM reader check 250 found no read-lock is held at any CPU in the CPU group. A conventional write-lock is not taken, and the conventional write-lock is not used in the present embodiment.

Refer now to FIG. 2B, a flowchart of a write-unlock method. When the writer is finished writing, the write-unlock method is initiated 280. The write-unlock method clears the writer-present flag 285, and the write-lock is released 290.

Pseudo-Code—Write-Lock and Write-Unlock Methods

Pseudo-Code for a Write-Lock Method

The following exemplary pseudo-code algorithm is a non-limiting example of an implementation of a write-lock method:

```
While (True) {
    If WRITER_PRESENT flag is set {
        Spin    // spin and check for flag to be cleared.
    }
    // Set the flag using CMP-XCHG instruction. If setting the flag
    // fails, indicating that WRITER_PRESENT flag has been set
    // by another thread), then go back to start.
    Set WRITER_PRESENT flag
    If unsuccessful {
        Continue    // start over again
    }
    // for all CPUs make sure readers are done
    For each CPUs {
        // Check and Wait for Readers to finished
        If Read_lock held {
            Spin    // spin and check read-lock for done
        }
    }
    // Write-lock is successfully taken, no new readers
    // or writers can proceed now except this one.
    Break
}
```

Pseudo-Code for a Write-Unlock Method

```
Write_unlock
    Clear WRITER_PRESENT flag
```

Description—Implementation of the Optimization

Figure 3:
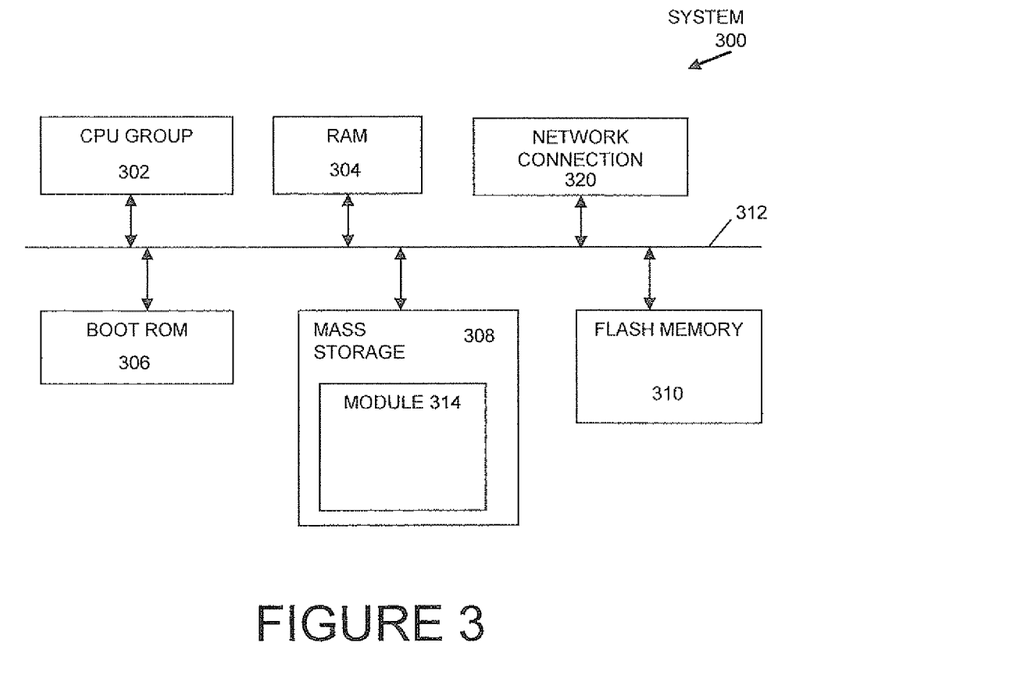
FIG. 3 is a high-level partial block diagram of an exemplary system configured to implement the optimization.

Refer now to FIG. 3, a high-level partial block diagram of an exemplary system 300 configured to implement an optimization for the management of locks of the present invention. System (processing system) 300 includes a CPU group 302 and four exemplary memory devices: a RAM 304, a boot ROM 306, a mass storage device (a hard disk) 308, and a flash memory 310, all communicating via a common bus 312. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processors of the CPU group 302, including but not limited to reduced instruction set computer (RISC) architecture and/or complex instruction set computer (CISC) architecture. An exemplary module (processing module) 314 is shown on mass storage 308, but as will be obvious to one skilled in the art, could be located on any of the memory devices. Modules can include computer programs, computer-readable code, and program code program for the described methods. Modules can be part of the system's operating system or stored separately, and can run concurrently with other modules.

Mass storage device 308 is a non-limiting example of a computer-readable storage medium bearing computer-readable code for implementing the optimization of locks described herein, such as module 314. Other examples of such computer-readable storage media include read-only memories such as CDs bearing such code.

System 300 may have an operating system stored on the memory devices, the ROM may include boot code for the system, and the processor may be configured for executing the boot code to load the operating system to RAM 304, executing the operating system to copy computer-readable code to RAM 304 and execute the code.

Network connection 320 provides communications to and from system 300. Typically, a single network connection provides one or more links, including virtual connections, to other devices on local and/or remote networks. Alternatively, system 300 can include more than one network connection (not shown), each network connection providing one or more links to other devices and/or networks.

System 300 can be implemented as a server or client respectively connected through a network to a client or server.

The above-described steps of the optimization, specifically including the read-lock method and write-lock method, can be viewed as module functions that can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for data access by a CPU, the method comprising the steps of:
    (a) a reader performing a first writer-present flag status check, and if said first writer-present, flag status check determines that said writer-present flag is:
        (i) set, repeating said step of checking; or
        (ii) cleared, initially acquiring said read-lock,
    (b) subsequent to said initially acquiring said read-lock, said reader performing, a second writer-present flag status check, and
    (c) if said second writer-present flag status check determines that said writer present flag is:
        (i) set, releasing said read-lock and repeating said first writer-present flag status check; or
        (ii) cleared, maintaining said read-lock.

2. (ii) The method of claim 1 wherein said repeating said step of checking includes implementing a spinlock.

3. The method of claim 1 wherein said read-lock is:
    (a) associated with a CPU group that includes a plurality of CPUs; and
    (b) for data accessed via said CPU group.

4. The method of claim 1 further comprising the step of:
    (c) releasing said read-lock.

5. The method of claim 4 wherein releasing said read-lock includes clearing said read-lock flag.

6. A method for data access by a CPU, the method comprising the steps of:
  (a) checking, by a writer, if a write-present flag is set or cleared; and
  (b) when said writer-present flag is cleared then acquiring by said writer a write-lock;
  wherein said step of checking includes performing a first writer-present flag status check, and if said first writer-present flag status check determines that said writer-present flag is:
    (i) set, repeating said step of checking; or
    (ii) cleared, setting said writer-present flag, and
  (c) subsequent to setting said writer-present flag, performing a second writer-present flag status check, and
  (d) if said second writer-present flag status check determines that said setting said writer-present flag is:
    (i) unsuccessful, repeating said first write-present flag status check; or
    (ii) successful, performing a read-lock check, if said read-lock check determines that said read-lock is:
      (A) set, repeating said performing a read-lock check; or
      (B) cleared, acquiring said write-lock.

7. The method of claim 6 wherein said repeating said step of checking includes implementing a spinlock.

8. The method of claim 6 wherein said repeating said step of performing a second writer-present flag status check includes implementing a spinlock.

9. The method of claim 6 wherein said write-lock is
  (a) associated with a CPU group that includes a plurality of CPUs; and
  (b) for data accessed via said CPU group.

10. The method of claim 6 further comprising the step of:
  (c) releasing said write-lock.

11. The method of claim 10 wherein releasing said write-lock includes clearing said writer-present flag.

12. A system comprising:
  (a) a processing system containing one or more processors, said processing system being configured to:
    (i) checking by a reader, via a first writer-present flag status check, and if said first writer-present flag status check determines that said writer-present flag is:
      (A) set, repeating said checking; or
      (B) cleared, initially acquiring said read-lock,
    (ii) subsequent to said initially acquiring said read-lock, said reader performing a second writer-present flag status check, and
    (iii) if said second writer-present flag status check determines that said writer-present flag is:
      (A) set, releasing said read-lock and repeating said first writer present flag status check: or
      (B) cleared, maintaining said read-lock.

13. A system comprising:
  (a) a processing system containing one or more processors, said processing system being configured to:
    (i) check, by a writer, if a writer-present flag is set or cleared; and
    (ii) when said writer-present flag is cleared then acquire by said writer a write-lock;
  wherein said processing system is further configured to perform said checking via a first writer-present flag status check, and if said first-writer present flag status check determines that said writer-present flag is:
    (A) set, repeating said step of checking; or
    (B) cleared, setting said writer-present flag, and
  (iii) subsequent to setting said writer-present flag, performing a second writer-present flag status check, and
  (iv) if said second writer-present flag status check determine that said setting said writer-present flag is:
    (A) unsuccessful, repeating said first writer-present flag status check or
    (B) successful, performing a read-lock check and if said read-lock check determines that said read-lock is:
      (I) set, repeating said performing a read-lock check; or
      (II) cleared, acquiring said write-lock.

14. A computer-readable storage medium having embedded thereon computer-readable code for data access by a CPU, the computer-readable code comprising program code for:
  (a) a reader performing a first writer-present flag status check, and if said first writer-present flag status cheek determines that said writer-present flag is:
    (i) set, repeating said step of checking; or
    (ii) cleared, initially acquiring said read-lock. (b) subsequent to said initially acquiring said read-lock, said reader performing a second writer-present flag status check, and
  (c) if said second writer-present flag status check determines that said writer present flag is:
    (i) set, releasing said read-lock and repeating said first writer-present flag status check; or
    (ii) cleared, maintaining said read-lock.

15. A computer-readable storage medium having embedded thereon computer-readable code for data access by a CPU, the computer-readable code comprising program code for:
  (a) checking, by a writer, if a write-present flag is set or cleared; and
  (b) when said writer-present flag is cleared then acquiring by said writer a write-lock;
  wherein said program code further performs said checking via a first writer-present flag status check, and if said first writer-present flag status check determines that said writer-present flag is:
    (i) set, repeating said step of checking; or
    (ii) cleared, setting said writer-present flag, and
  (c) subsequent to setting said writer-present flag, performing a second writer-present flag status check, and
  (d) if said second writer-present flag status check determines that said setting said writer-present flag is:
    (i) unsuccessful, repeating said first write-present flag status check; or
    (ii) successful, performing a read-lock check, if said read-lock check determines that said read-lock is:
      (A) set, repeating said performing a read-lock check; or
      (B) cleared, acquiring said write-lock.

\* \* \* \* \*

UNITED STATES PATENT AND TRADEMARK OFFICE
CERTIFICATE OF CORRECTION

| | | |
|---|---|---|
| PATENT NO. | : 9,569,265 B2 | Page 1 of 1 |
| APPLICATION NO. | : 14/507930 | |
| DATED | : October 7, 2014 | |
| INVENTOR(S) | : Ajay Chandel | |

It is certified that error appears in the above-identified patent and that said Letters Patent is hereby corrected as shown below:

In the Claims

Claim 2, Column 10, Line 60:

Change:
-- 2. (ii) The method of claim 1 wherein said repeating said step of checking includes implementing a spinlock. --

To:
"2. The method of claim 1 wherein said repeating said step of checking includes implementing a spinlock"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*